(12) United States Patent
Yamaji et al.

(10) Patent No.: US 6,685,219 B1
(45) Date of Patent: Feb. 3, 2004

(54) AIR BAG DEVICE

(75) Inventors: Naoki Yamaji, Suita (JP); Syuuhei Konishi, Suita (JP); Takeshi Inanzumi, Higashiosaka (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 09/787,637

(22) PCT Filed: Jul. 26, 2000

(86) PCT No.: PCT/JP00/05027

§ 371 (c)(1),
(2), (4) Date: Mar. 20, 2001

(87) PCT Pub. No.: WO01/07298

PCT Pub. Date: Feb. 1, 2001

(30) Foreign Application Priority Data

Jul. 28, 1999 (JP) .......................................... 11-213490

(51) Int. Cl.[7] .............................................. B60R 21/22
(52) U.S. Cl. ................................ 280/730.2; 280/743.1
(58) Field of Search ............................. 280/730.2, 749, 280/743.1, 728.2

(56) References Cited

U.S. PATENT DOCUMENTS

| | | | |
|---|---|---|---|
| 5,788,270 A | | 8/1998 | HANGland et al. .......... 280/729 |
| 6,010,149 A | * | 1/2000 | Riedel et al. .............. 280/730.2 |
| 6,042,141 A | * | 3/2000 | Welch et al. ............... 280/729 |
| 6,149,185 A | * | 11/2000 | White et al. .............. 280/728.2 |
| 6,155,596 A | * | 12/2000 | Nakajima et al. ......... 280/730.2 |
| 6,244,619 B1 | * | 6/2001 | Satzger ..................... 280/730.2 |
| 6,273,457 B1 | * | 8/2001 | Fischer ..................... 280/730.2 |
| 6,273,458 B1 | * | 8/2001 | Steffens et al. ........... 280/730.2 |
| 6,422,593 B1 | * | 7/2002 | Ryan ........................ 280/730.2 |
| 6,494,486 B2 | * | 12/2002 | Pausch et al. ............ 280/743.2 |
| 2002/0105174 A1 | * | 8/2002 | Tanase et al. ............. 280/730.2 |

FOREIGN PATENT DOCUMENTS

| | | |
|---|---|---|
| EP | 0 980 996 A2 * | 2/2000 |
| JP | 10-166988 | 6/1998 |
| JP | 11-34787 | 2/1999 |
| JP | 11-48901 | 2/1999 |
| JP | 11-321528 | 11/1999 |
| JP | 2000-272460 | 10/2000 |

* cited by examiner

*Primary Examiner*—Paul N. Dickson
*Assistant Examiner*—Laura B. Rosenberg
(74) *Attorney, Agent, or Firm*—Jordan and Hamburg LLP

(57) ABSTRACT

A curtain shaped air bag having a cylindrical inflatable portion which is continuously formed from the vicinity of an upper edge to the vicinity of a lower edge. In the curtain shape air bag, both end portions of the lower edge are attached to the vehicle body so that slack S elongating across the cylindrical inflatable portion is produced in a naturally attached condition of the curtain shape air bag 1. At an operation of an inflator, the cylindrical inflatable portion vertically extends so as to apply tension to the lower edge, thereby causing a protecting inflatable portion to be inflated in a condition where the curtain shape air bag is fixed in a desired position.

20 Claims, 6 Drawing Sheets

AIR BAG DEVICE

BACKGROUND OF THE INVENTION

The invention relates to an air bag device for preventing the head of an occupant from being directly hit on a side wall of a vehicle or a side window at a side collision, a roll, or other situations of the vehicle, and more particularly to an air bag device including a curtain shape air bag which, when a high load acts on a side portion of the vehicle, is developed along a roof rail on an inner wall of the vehicle, in an area from the side of a front pillar to the side of a rear pillar across a center pillar.

Conventionally, U.S. Pat. No. 5,778,270 and the like are known as an air bag device in which, when a high load acts on a side portion of a vehicle in a case including a side collision or a roll of a vehicle, an inflator is operated to cause a curtain shape air bag to be developed along a roof rail on an inner wall of the vehicle in an area from the side of a front pillar to the side of a rear pillar, thereby preventing the head of an occupant from being directly hit on a side wall of the vehicle or a side window.

The air bag device disclosed in the U.S. patent specification adopts a configuration in which a number of cylindrical inflatable portions that extend from an upper edge to a lower edge on development so as to be inflated in a cylindrical manner are disposed in parallel to each other over an entire area of the air bag, for the purpose of avoiding a situation that, when the curtain shape air bag is developed, slack is produced in a lower edge portion that is in a free condition, and an intended development area fails to be surely covered, so that an occupant cannot be effectively protected. With this configuration, at the time when the cylindrical inflatable portions are inflated, the surface of the curtain shape air bag is curved in a wavelike form, so as to contract the size in a horizontal direction of the air bag. Thus, the lower edge portion is tensed in the range between the both ends thereof, so that the lower edge portion is substantially fixed in a desired development area.

According to the technique disclosed in the above-identified U.S. patent specification, in addition to the inflatable portions required for protecting an occupant, it is necessary to form a number of cylindrical inflatable portions in order not to produce slack in a lower edge of the curtain shape air bag. Therefore, the number of sewing portions or welding portions is increased and the production cost is increased. In addition, there exists a problem in that an inflator of a larger capacity is required, with the result that also the cost for components is increased.

SUMMARY OF THE INVENTION

It is an object of the invention to provide an air bag device in which the number of sewing or welding portions is reduced as compared with the prior art, and in which a curtain shape air bag can be fixed to a desired development position on inflating by using an inflator of a small capacity without producing any slack in a lower edge portion, so that the cost is low and an occupant can be surely protected at the time of a side collision, or the like.

In order to attain the above-mentioned object, the air bag device of the invention is an air bag device including a curtain shape air bag which is developed from a front pillar side to a rear pillar side along a roof rail of an inner wall of a vehicle, by injecting a gas from an inflator which operates when a high load acts on a side portion of the vehicle, and characterized in that a protecting inflatable portion which is inflated by an operation of the inflator to protect an occupant, and at least one cylindrical inflatable portion which communicates with the protecting inflatable portion, and which is inflated in a continuous cylindrical manner from a vicinity of an upper edge to a vicinity of a lower edge of the air bag by the operation of the inflator are disposed in the curtain shape air bag, the curtain shape air bag is accommodated in a folded or wound manner while a plurality of portions of the upper edge of the curtain shape air bag are attached to a plurality of mounting points disposed in the roof rail, one of both end portions of the lower edge is attached to a mounting point disposed in the front pillar side, and another end portion is attached to a mounting point disposed in the rear pillar side, at least one of the mounting points in the front pillar side and the rear pillar side for attaching the both end portions of the lower edge is disposed in a position lower than the mounting points of the roof rail, and the curtain shape air bag is configured so that, in a condition in which the folding or winding is released, slack which elongates across the cylindrical inflatable portion is formed when any gas is not injected, and the cylindrical inflatable portion extends to eliminate the slack at the inflation due to injection of the gas, thereby applying tension to the lower edge of the curtain shape air bag.

In the invention, preferably, at least one of the cylindrical inflatable portions is configured so as to be inflated while interfering with a center pillar at the injection of the gas. In the invention, a configuration in which the curtain shape air bag is accommodated in a wound manner in which the lower edge is directed to an inner side of the vehicle can be preferably adopted.

Moreover, as the curtain shape air bag in the invention, a curtain shape air bag in which an inflatable portion that continuously extends along the lower edge is formed can be used. The continuous inflatable portion extending along the lower edge can be configured so as to form a gas passage for linking the cylindrical inflatable portion to the inflator.

Furthermore, in the invention, a gas passage for enabling the inflator to directly communicate with one of the cylindrical inflatable portions may be formed so that the gas from the inflator is first injected into the cylindrical A inflatable portion.

In addition, the invention can adopt a configuration in which, in the curtain shape air bag, mounting portions to the mounting points of the vehicle excluding both end portions of the lower edge are loosely attached to the respective mounting points via slots which are formed correspondingly to the mounting points, thereby enabling extension in inflation of the cylindrical inflatable portion. Alternatively, the invention can preferably adopt a configuration in which a slit or a cutout is formed in a predetermined position of the curtain shape air bag, thereby enabling extension in inflation of the cylindrical inflatable portion.

Unlike the prior art in which tension is applied by inflating a number of cylindrical inflatable portions disposed in a curtain shape air bag so as to contract a lower edge portion, the invention adopts a configuration in which a gas from an inflator is injected into one or several cylindrical inflatable portions which are formed continuously from the vicinity of the upper edge to the vicinity of the lower edge of a curtain shape air bag, so as to cause the cylindrical inflatable portion(s) to extend, and the lower edge of the curtain shape air bag in which both of lower edge end portions are fixed to the car body is stretched due to the extension, so as to apply tension to the lower edge, thereby attaining the intended object.

Specifically, in the curtain shape air bag in the invention, an upper edge portion is fixed in a plurality of positions to mounting points of the roof rail, one of the lower edge end portions is attached to a mounting point disposed on the front pillar side, and the other lower edge end portion is attached to a mounting point disposed on the rear pillar side. In addition, at least one of the mounting points for attaching the lower edge end portions is disposed in a lower position than the roof rail. The curtain shape air bag in a naturally attached condition (in a condition in which the folding or winding is released, and a condition in which any gas is not injected) produces slack which elongates across the cylindrical inflatable portions, and is accommodated in a folded or wound manner along the roof rail. When a gas from the inflator is injected into the cylindrical inflatable portions of the curtain shape air bag and the portions are inflated, the cylindrical inflatable portions extend so as to eliminate the slack and to push down part of the lower edge of the curtain shape air bag, because the cylindrical inflatable portions elongate from the vicinity of the upper edge to the vicinity of the lower edge of the curtain shape air bag. Under a state where both ends of the lower edge of the curtain shape air bag are respectively fixed to the mounting points, therefore, forming portions of the cylindrical inflatable portions are pulled downwardly, and tension acts on the lower edge portion, so as to be fixed in a regular position. The protecting inflatable portion into which the gas from the inflator is injected together with the cylindrical inflatable portions is inflated in a desired position, so as to protect an occupant.

When the configuration of the invention in which the cylindrical inflatable portions for applying tension to the lower edge of the curtain shape air bag are inflated while interfering with the center pillar is employed, even in the case where a side window is opened, the curtain shape air bag will not go out of a vehicle compartment via the side window, thereby attaining the above-mentioned functions and effects, so that an occupant can be surely protected.

Moreover, when the configuration of the invention in which the curtain shape air bag is accommodated in a wound manner so that the lower edge is directed to the inside of the vehicle is employed, the development of the curtain shape air bag in the extending condition of the cylindrical inflatable portions is smoothly performed along the inner side face of the vehicle. When used in combination with the configuration of the cylindrical inflatable portions for applying tension to the lower edge of the curtain shape air bag are inflated while interfering with the center pillar, the curtain shape air bag is developed downwardly while being guided by the center pillar even when the side window is opened, so that an occupant can be surely protected.

In the configuration of the invention in which the continuous inflatable portion is formed along the lower edge of the curtain shape air bag, the lower edge of the curtain-shape air bag becomes three dimensional on being inflated, and high rigidity is generated by a synergistic effect with the tension acting on the lower edge due to the extension of the cylindrical inflatable portions. In addition, the continuous inflatable portion of the lower edge is fitted between a seat and a door or an inner side wall, so as to play a roll for further enhancing the fixing effect of the position of the curtain shape air bag.

In a further embodiment, the above-mentioned continuous inflatable portion extending along the lower edge of the curtain shape air bag is used as the gas passage for linking the cylindrical inflatable portions to the inflator. When the curtain shape air bag is inflated, therefore, while the inflatable portion extending along the lower edge is first inflated, the cylindrical inflatable portions are inflated, so as to apply tension to the inflatable portion of the lower edge. Accordingly, the curtain shape air bag can be rapidly continuously developed from the folded or wound accommodated condition to a desired position, to be set into a fixed condition.

On the other hand, in yet another embodiment where the cylindrical inflatable portions for applying tension to the lower edge of the curtain shape air bag, the gas passage for directly injecting a gas from the inflator is formed. Accordingly, the downward development of the curtain shape air bag is rapidly performed, and at the same time tension can be promptly applied to the lower edge, so as to fix the position thereof. In addition, even if the inflator is disposed in an arbitrary position, the functions and effects can be attained.

The invention of an element for enabling the cylindrical inflatable portions of the curtain shape air bag to smoothly extend at the time of injection of the gas is additionally provided. Slots are disposed respectively in the plurality of mounting portions for the vehicle and disposed in an upper edge of the curtain shape air bag, and the curtain shape air bag is attached to the mounting points of the vehicle in a loose manner via the respective slots. When the gas is injected into the cylindrical inflatable portions, accordingly, the mounting portions are appropriately moved, thereby enabling the cylindrical inflatable portions to smoothly extend. On the other hand, a slit or a cutout is formed in a predetermined position of the curtain shape air bag. When a gas is injected into the cylindrical inflatable portions, therefore, the slit or the cutout is widened, thereby enabling the cylindrical inflatable portions to smoothly extend. In the invention, the characteristic configurations of slots and a slit or a cutout can be used in combination.

BRIEF DESCRIPTION OF THE DRAWINGS

FIG. 2 is an explanatory view of a naturally attached condition of the curtain shape air bag 1 in the fundamental embodiment of the invention in which

FIG. 3 is an explanatory view of a developed condition of the curtain shape air bag 1 of FIG. 2 in which

BEST MODE FOR CARRYING OUT THE INVENTION

Hereinafter embodiments of the invention will be described with reference to the accompanying drawings.

Figure 1:
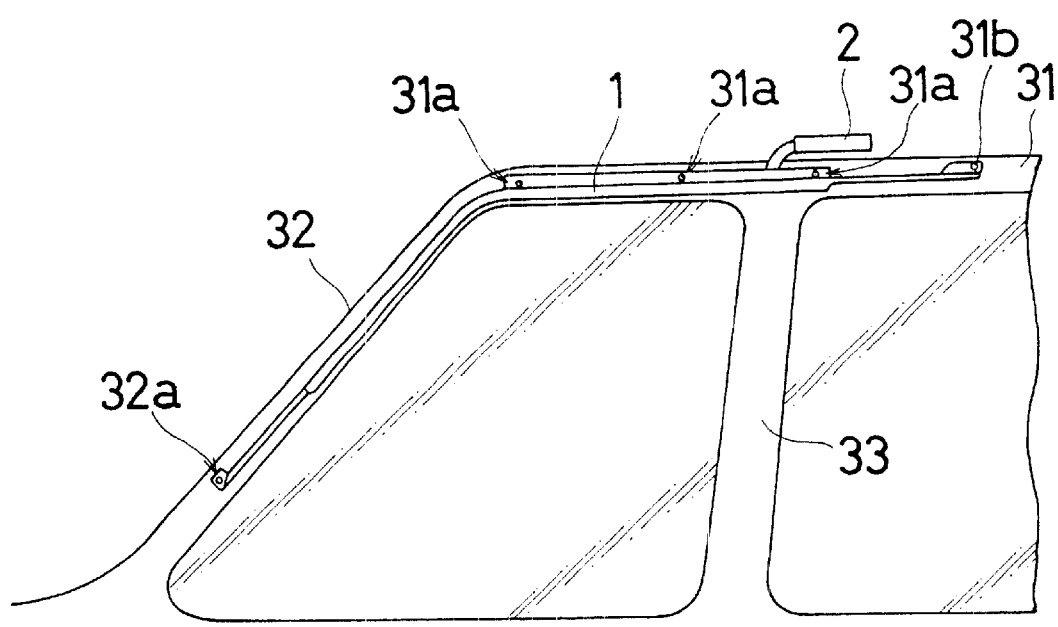
FIG. 1 is a schematic side view showing an accommodated condition of a curtain shape air bag 1 in a fundamental embodiment of the invention.
Figure 2A:
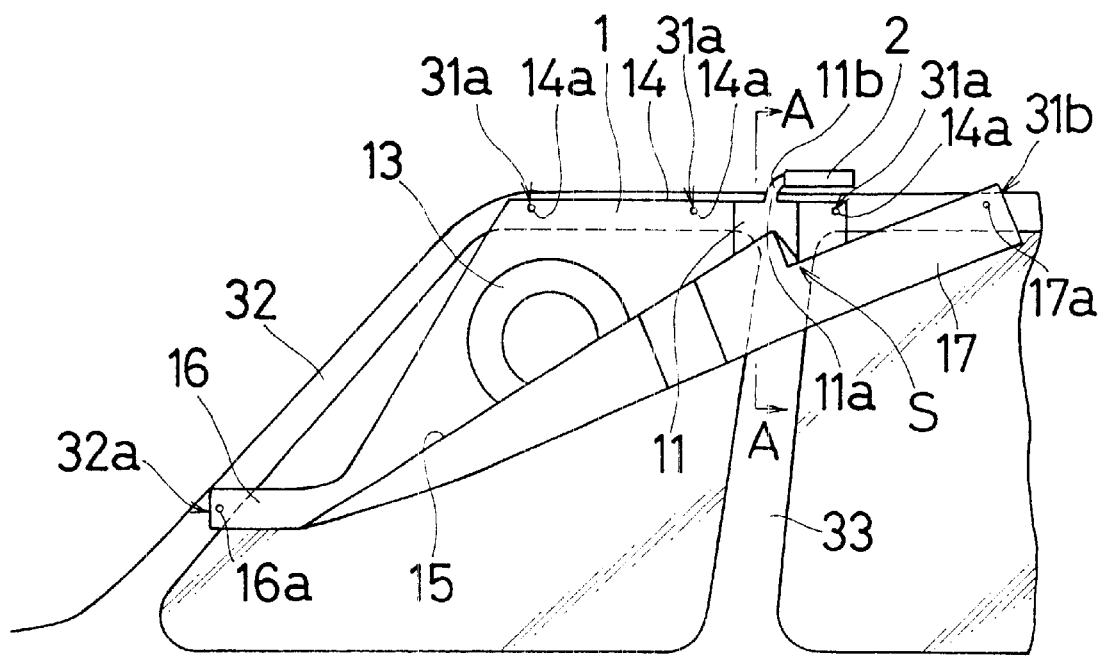
FIG. 2(A) is a schematic side view.
Figure 2B:
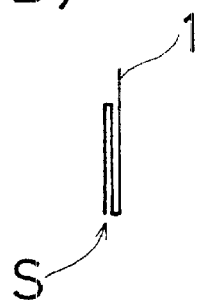
FIG. 2(B) is a schematic section view taken along line A—A of the figure.
Figure 3A:
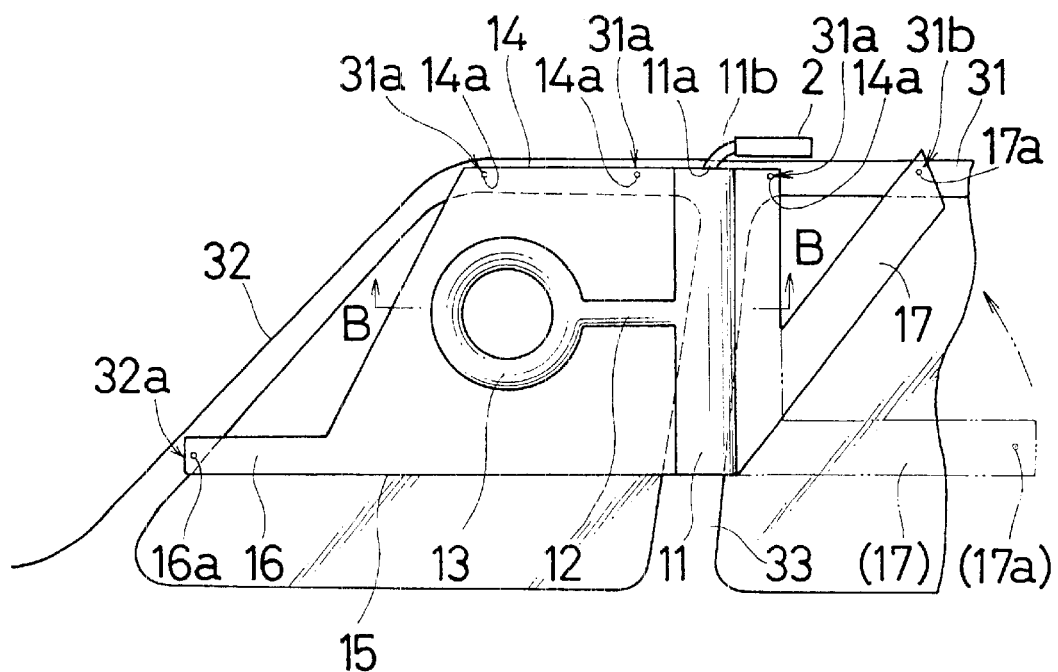
FIG. 3(A) is a schematic side view.
Figure 3B:
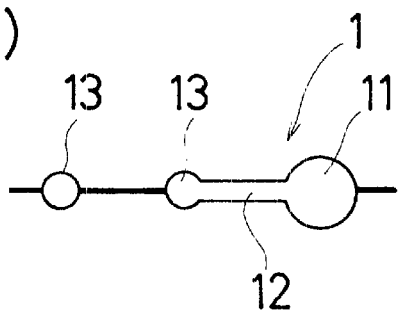
FIG. 3(B) is a schematic section view taken along line B—B of the figure.

FIGS. 1, 2, and 3 are explanatory views of a fundamental embodiment of the invention. FIG. 1 is a schematic side view showing an accommodated condition of a curtain shape air bag 1. FIG. 2 is an explanatory view of a naturally attached condition of the curtain shape air bag 1, i.e., a condition in which the accommodation is released and no gas is injected, FIG. 2 (A) is a schematic side view, and FIG. 2(B) is a schematic section view taken along line A—A of the figure. FIG. 3 is an explanatory view of an operating condition of the curtain shape air bag, i.e., a condition in which the curtain shape air bag is developed by the injection of a gas, FIG. 3(A) is a schematic side view, and FIG. 3(B) is a schematic section view taken-along line B—B of the figure.

In this embodiment, in the curtain shape air bag 1, formed are a cylindrical inflatable portion 11 which is continuously formed from the vicinity of an upper edge to the vicinity of a lower edge, and a protecting inflatable portion 13 which communicates with the cylindrical inflatable portion 11 via a communicating portion12.

The curtain shape air bag 1 is attached in a plurality of mounting portions 14a disposed in an upper edge 14 thereof, to a plurality of mounting points 31a disposed in a roof rail 31 of a vehicle, respectively. Strip-like portions 16 and 17 which outward extend are integrally formed in end portions of a lower edge 15, respectively. Mounting portions 16a and 17a are formed also in end portions of the strip-like portions 16 and 17, respectively. One mounting portion 16a of the mounting portions is attached to a mounting point 32a which is disposed in a substantially middle position in a vertical direction of a front pillar 32 of the vehicle, and the other mounting portion 17a is attached to a mounting point 31b which is disposed in a rear position of the roof rail 31 with respect to the center pillar 33. The cylindrical inflatable portion 11 is formed so that, in the developed condition, the cylindrical inflatable portion is positioned substantially along the center pillar 33.

In the curtain shape air bag 1, the lower edge 15 of the bag itself is linear as indicated by the two-dot chain line in FIG. 3, and also the strip-like portion 17 on the rear side extends along the lower edge 15. In the mounting to the vehicle, the mounting portion 17a at the forward end of the strip-like portion 17 is lifted to the level of the roof rail 31 and then attached to the mounting point 31b, so that slack S which elongates across the cylindrical inflatable portion 11 is formed in the curtain shape air bag 1 in the naturally attached condition shown in FIG. 2.

According to this mounting structure, the curtain shape air bag 1 in the naturally attached condition is not tensed, and, as shown in FIG. 1, the curtain shape air bag 1 can be accommodated in a wound manner along the roof rail 31.

The cylindrical inflatable portion 11, the communicating portion 12, and the protecting inflatable portion 13 of the curtain shape air bag 1 are made into a bag-like shape by being sewn in an air tight manner with respect to the outside, except for a gas inlet 11a formed in an upper end portion of the cylindrical inflatable portion 11. A gas nozzle of an inflator 2 which is fixedly disposed in the vicinity of the roof rail 31 is connected to the gas inlet 11a via a gas passage 11b, so that a gas is injected into the cylindrical inflatable portion 11 and the protecting inflatable portion 13 by the operation of the inflator 2. The inflator 2 operates in accordance with a signal sup plied from a control unit (not shown) into which a detection output from a sensor (not shown) for detecting an application of a high load acting on a side face of the vehicle is input-, so as to inject the gas into the cylindrical inflatable portion 11 and the protecting inflatable portion 13, thereby causing them to be inflated.

According to the above-described embodiment, when the inflator 2 operates from the accommodated condition shown in FIG. 1, the cylindrical inflatable portion 11 and the protecting inflatable portion 13 are inflated with a minute time difference. Since the cylindrical inflatable portion 11 is continuously formed from the vicinity of the upper edge 14 to the vicinity of the lower edge 15 of the curtain shape air bag 1, the lower edge 15 is pulled downwardly due to the inflation, so that the air bag 1 extends so as to eliminate the slack S. Herein, the lower edge 15 of the curtain shape air bag 1 is fixed and attached in the mounting portions 16a and 17a formed in the strip-like portions 16 and 17 at both ends thereof, to the mounting points 32a and 31b of the vehicle, respectively. Therefore, the lower edge 15 is pulled downwardly between the mounting portions 16a and 17a by the extension of the cylindrical inflatable portion 11, so that tension acts on the lower edge 15. Accordingly, the position is stable in a desired position, and the lower edge 15 is set in a positioned and fixed condition. When the protecting inflatable portion 13 is inflated in this condition, therefore, the position of the protecting inflatable portion 13 also is set in a condition in which it is stably fixed in a regular position, so that the head portion of an occupant can be surely protected.

Since the gas from the inflator 2 is first and directly injected into the cylindrical inflatable portion 11 the downward development of the curtain shape air bag 1 is rapidly performed, and tension can be promptly applied to the lower edge 15, thereby enabling the positioning to be performed. When the shape of the gas passage 11b for directly linking the cylindrical inflatable portion 11 to the inflator 2 is appropriately changed, the above-mentioned functions and effects can be attained even if the inflator 2 is disposed in an arbitrary position in accordance with the vehicle body structure. Thus, any layout can be realized depending on various vehicle types. In addition, since the cylindrical inflatable portion 11 is to extend along the center pillar 33, the curtain shape air bag 1 will not go out of the compartment of the vehicle even when the side window is opened, and the occupant can be surely protected.

Figure 4:
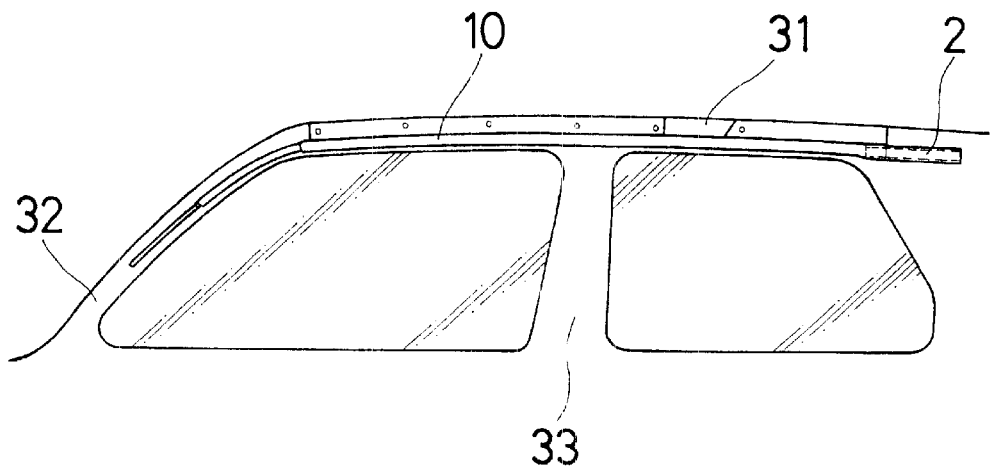
FIG. 4 is a side view showing an accommodated condition of a curtain shape air bag 10 in a practical embodiment of the invention.
Figure 5:
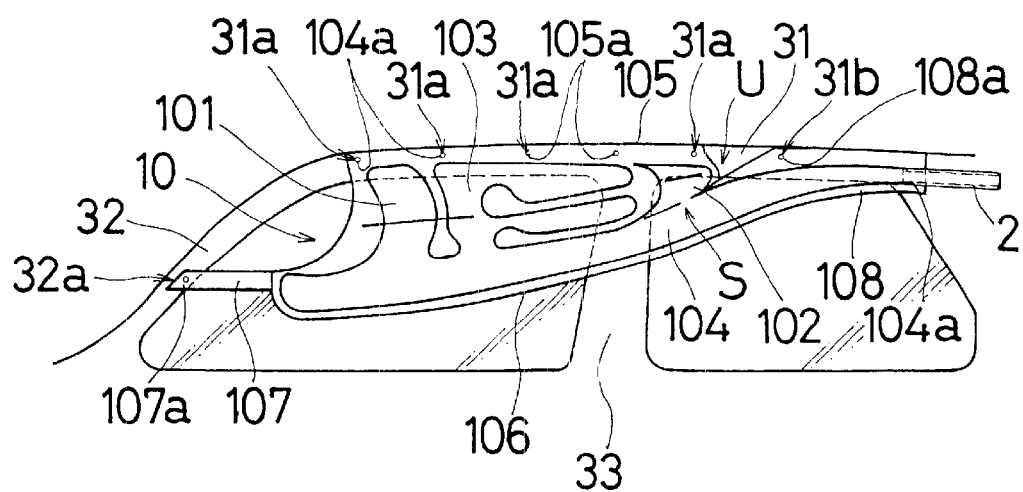
FIG. 5 is a side view showing a naturally attached condition of the curtain shape air bag 10 in the practical embodiment of the invention.
Figure 6:
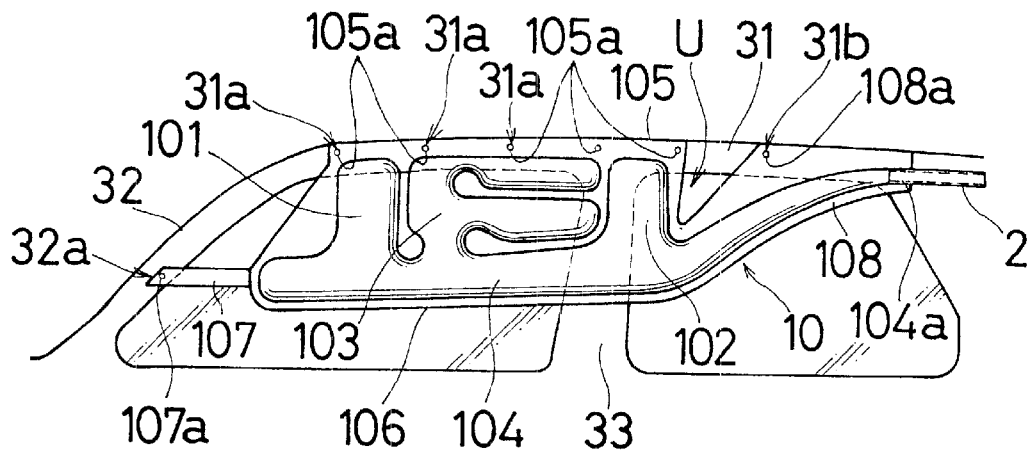
FIG. 6 is a side view showing a developed condition of the curtain shape air bag 10 of FIG. 5.
Figure 7:
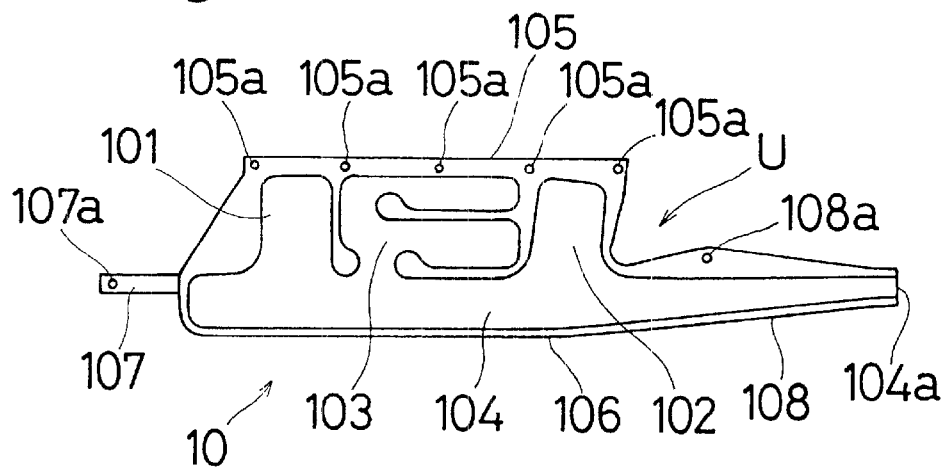
FIG. 7 is a view showing a condition in which the curtain shape air bag 10 of FIG. 5 is detached from a vehicle body, and then developed singly.

Next, a more practical embodiment of the invention will be described. FIG. 4 is a side view showing an accommodated condition of a curtain shape air bag 10. FIG. 5 is a side view showing a naturally attached condition of the curtain shape air bag 10. FIG. 6 is a side view showing a developed condition of the curtain shape air bag 10. FIG. 7 is a view showing a condition where the curtain shape air bag 10 is detached from a vehicle body, and then developed singly. In the curtain shape air bag 10 of this example, two cylindrical inflatable portions 101 and 102 which are continuously formed from the vicinity of an upper edge 105 to the vicinity of a lower edge 106, a protecting inflatable portion 103 which is disposed therebetween, and a transverse inflatable portion 104 which extends in a substantially horizontal direction continuously along the lower edge 106 are formed. In an end portion on the rear side of the transverse inflatable portion 104, a gas inlet 104a is formed. A gas nozzle of an inflator 2 which is fixed on a rear side of a roof rail 31 and which operates in the same manner as that of the former embodiment is connected to the gas inlet 104a. The two cylindrical inflatable portions 101 and 102 and the protecting inflatable portion 103 are configured so that a gas from the inflator 2 is injected thereinto via the transverse inflatable portion 104 of the curtain shape air bag 10 in this embodiment, the lower edge 106 is substantially linear, and strip-like portions 107 and 108 are integrally formed at both end portions thereof. Part of the transverse inflatable portion 104 is formed in the strip-like portion 108 on the rear side. The curtain shape air bag 10 is attached in a plurality-of mounting portions 105a disposed in the upper edge 105, to a plurality of mounting points 31a disposed in the roof rail 31 of a vehicle, respectively. A mounting portion 107a disposed in a forward end portion of the strip-like portion 107 on the front side of the lower edge 106 is attached to a mounting point 32a which is disposed in a substantially middle position in a vertical direction of a front pillar 32 of the vehicle, and a mounting portion 108a which is disposed in a substantially middle position in a transverse direction of the strip-like portion 108 on the rear side is attached to a mounting point 31b disposed in a rear position of the roof rail 31 with respect to the center pillar 33.

Since the curtain shape air bag 10 is attached to the vehicle body in the above-described manner, the substantially middle position of the strip-like portion 108 on the rear side is lifted to the level of the roof rail 31. As a result, in a naturally attached condition, a condition where slack S which elongates across the cylindrical inflatable portion 102 on the rear side is produced, and a cutout portion U is formed between the most rear one of the mounting portions 105a of the upper edge 105 and the mounting portion 108a of the strip-like portion 108 is attained.

Each of the mounting portions 105a of the upper edge 105 of the curtain shape air bag is formed into slot extending in a transverse direction. The pitch between the respective mounting portions 105a is longer than the pitch of the mounting points 31a disposed in the roof rail 31 Each of the mounting points 31a has slot having a head portion. The mounting portions 105a having slot and disposed in the upper edge 105 of the curtain shape air bag 10 are loosely attached to shank portions of the pin-like mounting points 31a having a head portion, and then pressed by the head portions, so that the upper edge 105 of the curtain shape air bag 10 is attached to the roof rail 31 while forming slight slack between the respective mounting portions 105a.

Due to the existence of the slack S elongating across the cylindrical inflatable portion 102, the cutout portion U, and the slack between the mounting portions 105a of the upper edge 105, the curtain shape air bag 10 in the naturally attached condition is not tensed, and hence can be accommodated in a wound manner as shown in FIG. 4.

Figure 8:
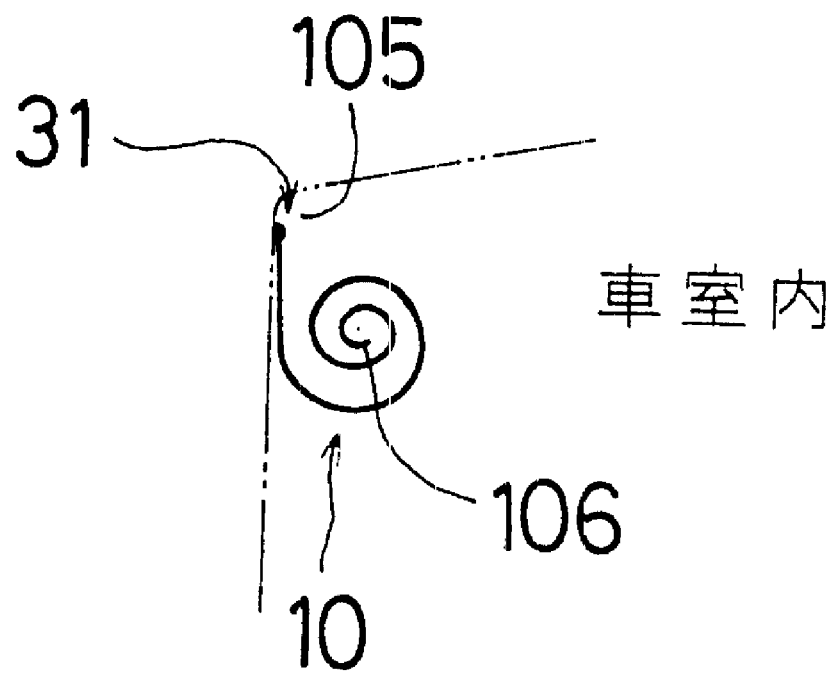
FIG. 8 is a schematic view illustrating a winding direction in an accommodated condition of the curtain shape air bag 10 of FIG. 5.

The winding direction in the accommodated condition of the curtain shape air bag 10 is set to coincide with a winding direction in which the side of the lower edge 106 is bent and wound to the inner side of the vehicle, as shown in the schematic section view of FIG. 8. The cylindrical inflatable portion 102 on the rear side is formed so as to be in a position substantially along the center pillar 33 in the developed condition.

In the above-described embodiment, when the inflator 2 operates, a gas is injected first into the transverse inflatable portion 104, and the gas is sequentially injected into the cylindrical inflatable portion 102 on the rear side, the protecting inflatable portion 103, and the cylindrical inflatable portion 101 on the front side, via the transverse inflatable portion 104. In an initial operation stage of the inflator 2, the cylindrical inflatable, portion 102 is inflated while the transverse inflatable portion 104 is being inflated. At this time, since the cylindrical inflatable portion 102 is continuously formed from the vicinity of the upper edge 105 to the vicinity of the lower edge 106 of the curtain shape air bag 10, the cylindrical inflatable portion 102 extends due to the inflation, so as to downwardly pull the transverse inflatable portion 104 which is formed in the lower edge 106 and inflated. Thus, the slack S is eliminated, and the cutout portion U is widened. As for the lower edge 106 of the curtain shape air bag 10, the both end portions are fixed to the vehicle body via the strip-like portions 107 and 108, so that tension acts on the transverse inflatable portion 104 of the lower edge 106. As a result, the transverse inflatable portion 104 and the cylindrical inflatable portion 102 are always set to a condition in which they are developed and fixed in a regular position by the inflation. In this condition, the protecting inflatable portion 103 and the cylindrical inflatable portion 101 on the front side are inflated, so as to further ensure the fixed condition of the curtain shape air bag 10 to the vehicle body. Thus, an occupant can be surely protected.

In the above-mentioned operation at the development of the curtain shape air bag 10, since the mounting portions 105a of the upper edge 105 are loosely attached to the mounting points 31a of the roof rail 31 in a condition in which slight slack is formed between them, the extending operation of the cylindrical inflatable portion 102 is smoothly performed by the appropriate movement of the respective mounting portions 105a together with the widening operation of the cutout portion U.

Moreover, the curtain shape air bag 10 is accommodated by being wound in the direction indicated in FIG. 8, and the cylindrical inflatable portion 102 is formed in a position substantially along the center pillar 33 in the developed condition. Therefore, the curtain shape air bag 10 is developed so as to be wound back smoothly along a side face of the compartment of the vehicle. At the development, the cylindrical inflatable portion 102 is guided by the center pillar 33. Even when a side window is opened, therefore, the curtain shape air bag 10 is surely fixed in the regular position and developed without going out of the vehicle.

In the above-described embodiment, in an initial operation stage of the inflator 2, a gas is injected into the transverse inflatable portion 104 which is formed continuously along the lower edge 106 of the curtain shape air bag 10, so that the transverse inflatable portion 104 is inflated. Then, the transverse inflatable portion 104 is moved by being downwardly pulled by the subsequent inflation (extension) of the cylindrical inflatable portion 102. Accordingly, the lower edge 106 of the curtain shape air bag has a three-dimensional structure to which rigidity is provided due to inflation, and a downward force is applied to the middle portion and tension is applied, so that rigidity is provided also in a bending direction and a twisting direction. In addition, since the transverse inflatable portion 104 is set into a fixed condition with being sandwiched between a seat and a door or a side wall of the vehicle body, the positioning function at the development of the curtain shape air bag 10 is extremely stable. According to experiments, it has been checked that, when the internal pressure of the curtain shape air bag 10 is set to 20 to 30 kpa, particularly, the rigidity of the transverse inflatable portion 104 becomes very high, and the transverse inflatable portion 104 cannot be bent even in the case where an occupant hits thereon.

In the embodiments above, examples have been described in which, in both end portions of the lower edge of the curtain shape air bag, the end portion on the rear pillar side is attached to the mounting point along the roof rail, and the end portion on the front pillar side is attached to the mounting point in the lower position than the roof rail. Conversely, the end portion on the rear pillar side may be attached in a position lower than the roof rail, and the end portion on the front pillar side may be attached in a position along the roof rail. Moreover, both ends of the lower edge of the curtain shape air bag may be attached to mounting points in positions lower than the roof rail, respectively.

As described above, according to the invention, one or several cylindrical inflatable portions are continuously formed from the vicinity of the upper edge to the vicinity of the lower edge in the curtain shape air bag, so that the cylindrical inflatable portion(s) is caused to extend at the operation of the inflator, and effective tension is applied to the lower edge of the curtain shape air bag. Thus, the development position can be fixed in a regular position. The curtain shape air bag can be stably fixed in a desired development position without producing any slack in the lower edge, and with a reduced number of sewing or welding portions as compared with a prior-art device in which a number of cylindrical inflatable portions are formed in parallel. Therefore, an occupant can be protected.

According to the structure of the curtain shape air bag of the invention, an amount of gas required for the development is smaller as compared with a prior-art device, so that it is possible to protect an occupant by using an inflator with a reduced capacity. This cooperates with the reduction in sewing or welding to obtain an air bag device with high performance at a low cost. In addition, since a smaller amount of gas is required for the development, it is possible to shorten the time period for attaining the final development. Thus, it is possible to rapidly become ready for protecting an occupant.

Moreover, the number of cylindrical inflatable portions for applying tension to the lower edge of the curtain shape air bag and for fixing the position thereof is requested to be only one or several. The protecting inflatable portion for protecting an occupant can have an arbitrary shape. When a shape optimum for each of vehicle type is adopted, also the function of protecting an occupant can be improved.

Since the cylindrical inflatable portion is caused to extend while interfering with the center pillar, the shape air bag can be smoothly develope without being affected by an opened or closed state of the side window, thereby protecting an occupant can be improved.

Since an inflatable portion (the transverse inflatable portion) which is continuously formed along the lower edge of the curtain shape air bag is disposed, positioning and fixing are enabled while applying tension in a condition where, when the inflator is activated, the rigidity is provided also in a bending direction and a twisting direction, thereby performing the positioning and fixing. In conjunction with the fixing of the transverse inflatable portion between the seat and the door or the like, it is possible the realize more reliable and stable positioning and occupant protection.

What is claimed is:

1. An air bag arrangement comprising a vehicle and an air bag device including a curtain shape air bag which is developed from a front pillar side to a rear pillar side along a roof rail of an inner wall of the vehicle, by injecting a gas from an inflator which operates when a high load acts on a side portion of the vehicle, wherein a protecting inflatable portion which is inflated by an operation of said inflator to protect an occupant, and at least one cylindrical inflatable portion which communicates with said protecting inflatable portion, and which is inflated by the inflator in a continuous cylindrical manner and extends from a vicinity of an upper edge to a vicinity of a lower edge, are disposed in the curtain shape air bag, said curtain shape air bag is accommodated in a folded or wound manner while a plurality of portions of the upper edge of said curtain shape air bag are attached to a plurality of mounting points disposed in said roof rail, one of both end portions of said lower edge is attached to a mounting point disposed in said front pillar side, and another end portion is attached to a mounting point disposed in said rear pillar side, at least one of said mounting points in said front pillar side and said rear pillar side for attaching said both end portions of said lower edge is disposed in a position lower than said mounting points of said roof rail, and said curtain shape air bag is configured so that, in a condition in which the folding or winding is released and gas is not injected, said mounting points of said both ends of said lower edge suspend said lower edge, at a position beneath said cylindrical inflatable portion, at a first distance from said roof rail which is less than a length of said air bag from said upper edge, at a position above said cylindrical inflatable portion, to said lower edge, at the position beneath said cylindrical inflatable portion, when said air bag is laid flat in an uninstalled state to thereby produce slack in said cylindrical inflatable portion, and said cylindrical inflatable portion extends to eliminate the slack at the inflation due to injection of the gas, thereby applying tension to said lower edge of said curtain shape air bag.

2. An air bag device according to claim 1 wherein at least one of said cylindrical inflatable portions is configured so as to be inflated while interfering with a center pillar at the injection of the gas.

3. An air bag device according to claim 1 or 2, wherein said curtain shape air bag is accommodated in a wound manner in which said lower edge is directed to an inner side of the vehicle.

4. An air bag device according to claim 1 or 2, wherein an inflatable portion that continuously extends along said lower edge is formed in said curtain shape air bag.

5. An air bag device according to claim 4, wherein said continuous inflatable portion extending along said lower edge of said curtain shape air bag forms a gas passage for linking said cylindrical inflatable portion to said inflator.

6. An air bag device according to claim 1 or 2, wherein a gas passage for enabling said inflator to directly communicate with one of said cylindrical inflatable portions is formed so that the gas from said inflator is first injected into said cylindrical inflatable portion.

7. An air bag device according to claim 1 or 2, wherein, in said curtain shape air bag, mounting portions to the mounting points of the vehicle excluding both end portions of said lower edge arc loosely attached to said respective mounting points via slots which are formed correspondingly to said mounting points, thereby enabling extension in inflation of said cylindrical inflatable portion.

8. An air bag device according to claim 1 or 2, wherein a slit or a cutout is formed in a predetermined position of said curtain shape air bag, thereby enabling extension in inflation of said cylindrical inflatable portion.

9. An air bag device installed in a vehicle, comprising;

an air bag mounted to at least a front pillar and a roof rail of the vehicle;

an inflator;

said air bag including a protecting inflatable portion and a cylindrical inflatable portion each communicated with said inflator, said air bag having an upper edge attached at mounting points to said roof rail;

said air bag having a lower edge with a first end portion attached at a mounting point to said front pillar at a position which is lower than said mounting points at said roof rail; and said lower edge having a second end portion mounted such that, in an unstowed, uninflated hanging state, said second end portion is higher than said first end portion, and said lower edge is suspended by the mounting of said first and second end portions such that said lower edge, at a position beneath said cylindrical inflatable portion, is disposed at a first distance from said roof rail which is less than a length of said air bag from said upper edge, at a position above said cylindrical inflatable portion, to said lower edge, at the position beneath said cylindrical inflatable portion, when said air bag is laid flat in an uninstalled state to thereby produce slack in said cylindrical inflatable portion so that when said cylindrical inflatable portion is inflated said cylindrical inflatable portion extends to eliminate the slack and apply tension to said lower edge of said air bag.

10. The air bag device according to claim 9, wherein said cylindrical inflatable portion is inflated in a continuous manner by operation of said inflator and extends from a vicinity of the upper edge to a vicinity of the lower edge of said air bag.

11. The air bag device according to claim 10, wherein said second round end portion is disposed higher than said first end portion by mounting to said roof rail.

12. An air bag device according to claim 11, wherein said cylindrical inflatable portion interferes with a center pillar of the vehicle when inflated.

13. An air bag device according to claim 12, further comprising an inflatable portion extending along said lower edge of said air bag.

14. An air bag device according to claim 13, wherein said inflatable portion extending along said lower edge of said air bag is a gas passage for linking said cylindrical inflatable portion to said inflator.

15. The air bag device according to claim 9, wherein said second end portion is disposed higher than said first end portion by mounting to said roof rail.

16. An air bag device according to claim 15, wherein said cylindrical inflatable portion interferes with a center pillar of the vehicle when inflated.

17. An air bag device according to claim 9, wherein said cylindrical inflatable portion interferes with a center pillar of the vehicle when inflated.

18. An air bag device according to claim 9, further comprising an inflated portion along said lower edge of said air bag.

19. An air bag device according to claim 18, wherein said inflated portion extended along said lower edge of said air bag is a gas passage for linking said cylindrical inflatable portion to said inflator.

20. The air bag device according to claim 19, wherein said second end portion is disposed higher than said first end portion by mounting to said roof rail.

* * * * *